US008827717B2

(12) United States Patent
Pope et al.

(10) Patent No.: US 8,827,717 B2
(45) Date of Patent: Sep. 9, 2014

(54) PHYSIOLOGICALLY MODULATING VIDEOGAMES OR SIMULATIONS WHICH USE MOTION-SENSING INPUT DEVICES

(75) Inventors: Alan T. Pope, Poquoson, VA (US); Chad L. Stephens, Poquoson, VA (US); Nina Marie Blanson, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 395 days.

(21) Appl. No.: 13/166,166

(22) Filed: Jun. 22, 2011

(65) Prior Publication Data

US 2012/0004034 A1    Jan. 5, 2012

Related U.S. Application Data

(60) Provisional application No. 61/499,733, filed on Jun. 22, 2011, provisional application No. 61/361,084, filed on Jul. 2, 2010.

(51) Int. Cl.
    *G09B 5/06*       (2006.01)

(52) U.S. Cl.
    USPC ............................... 434/247; 434/236; 463/39

(58) Field of Classification Search
    USPC .......................................... 434/236, 247–261
    See application file for complete search history.

(56) References Cited

U.S. PATENT DOCUMENTS

| | | | |
|---|---|---|---|
| 4,065,860 A * | 1/1978 | Linton et al. ................... | 434/22 |
| 4,337,049 A | 6/1982 | Connelly | |
| 4,508,510 A | 4/1985 | Clifford | |
| 5,377,100 A | 12/1994 | Pope et al. | |
| 5,626,140 A | 5/1997 | Feldman et al. | |
| 5,697,791 A | 12/1997 | Nashner et al. | |
| 5,702,323 A | 12/1997 | Poulton | |
| 5,743,744 A | 4/1998 | Cassily et al. | |
| 5,907,819 A | 5/1999 | Johnson | |
| 5,947,868 A | 9/1999 | Dugan | |
| 5,984,684 A | 11/1999 | Brostedt et al. | |
| 6,067,468 A | 5/2000 | Korenman et al. | |
| 6,093,146 A | 7/2000 | Filangeri | |
| 6,126,449 A | 10/2000 | Burns | |
| 6,132,337 A | 10/2000 | Krupka et al. | |
| 6,212,427 B1 | 4/2001 | Hoover | |

(Continued)

OTHER PUBLICATIONS

Alan T. Pope, Edward H. Bogart, and Debbie S. Bartolome, "Biocybernetic System Evaluates Indices of Operator Engagement in Automated Task", Biological Psychology 40 (1995), pp. 187-195.

*Primary Examiner* — Sam Yao
*Assistant Examiner* — Thomas Hong
(74) *Attorney, Agent, or Firm* — Jennifer L. Riley; Thomas K. McBride, Jr.; Andrea Z. Warmbier

(57) ABSTRACT

New types of controllers allow players to make inputs to a video game or simulation by moving the entire controller itself. This capability is typically accomplished using a wireless input device having accelerometers, gyroscopes, and an infrared LED tracking camera. The present invention exploits these wireless motion-sensing technologies to modulate the player's movement inputs to the videogame based upon physiological signals. Such biofeedback-modulated video games train valuable mental skills beyond eye-hand coordination. These psychophysiological training technologies enhance personal improvement, not just the diversion, of the user.

20 Claims, 8 Drawing Sheets

(56) References Cited

U.S. PATENT DOCUMENTS

| | | |
|---|---|---|
| 6,259,889 B1 | 7/2001 | LaDue |
| 6,261,189 B1 | 7/2001 | Saville et al. |
| 6,277,030 B1 | 8/2001 | Baynton et al. |
| 6,425,764 B1 | 7/2002 | Lamson |
| 6,450,820 B1 * | 9/2002 | Palsson et al. ............... 434/236 |
| 6,463,385 B1 | 10/2002 | Fry |
| 6,491,647 B1 | 12/2002 | Bridger et al. |
| 6,527,700 B1 | 3/2003 | Manico et al. |
| 6,682,351 B1 | 1/2004 | Abraham-Fuchs et al. |
| 6,774,885 B1 | 8/2004 | Even-Zohar |
| 6,778,866 B1 | 8/2004 | Bettwy |
| 6,786,730 B2 | 9/2004 | Bleckley et al. |
| 2003/0013071 A1 | 1/2003 | Thomas |
| 2003/0013072 A1 | 1/2003 | Thomas |
| 2003/0087220 A1 | 5/2003 | Bessette |
| 2005/0014113 A1 | 1/2005 | Fleck et al. |
| 2007/0060384 A1 * | 3/2007 | Dohta ............................ 463/43 |
| 2007/0118043 A1 * | 5/2007 | Oliver et al. ................. 600/519 |
| 2008/0081692 A1 * | 4/2008 | Pope et al. ...................... 463/31 |
| 2008/0291160 A1 * | 11/2008 | Rabin ........................... 345/156 |

* cited by examiner

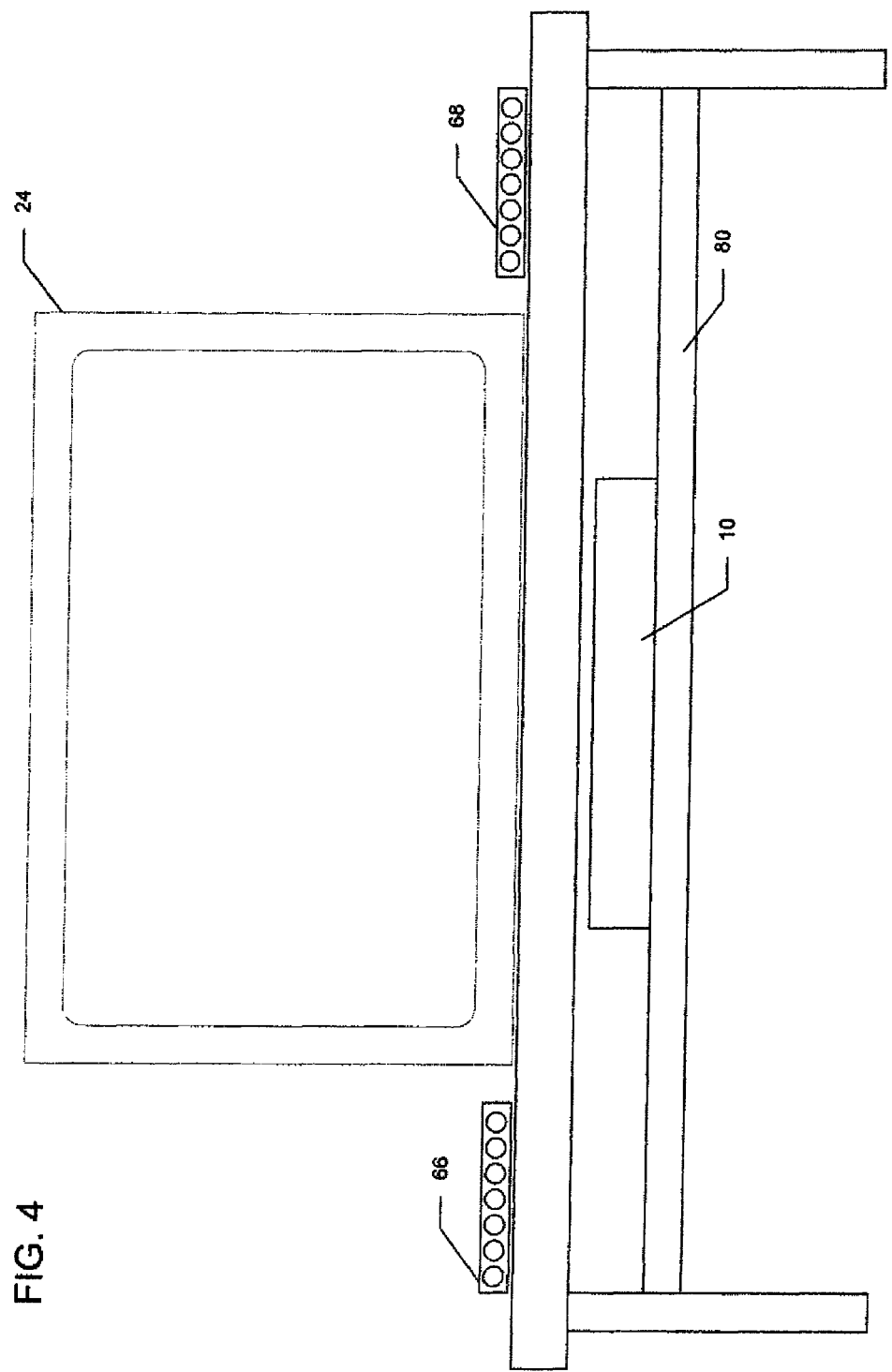

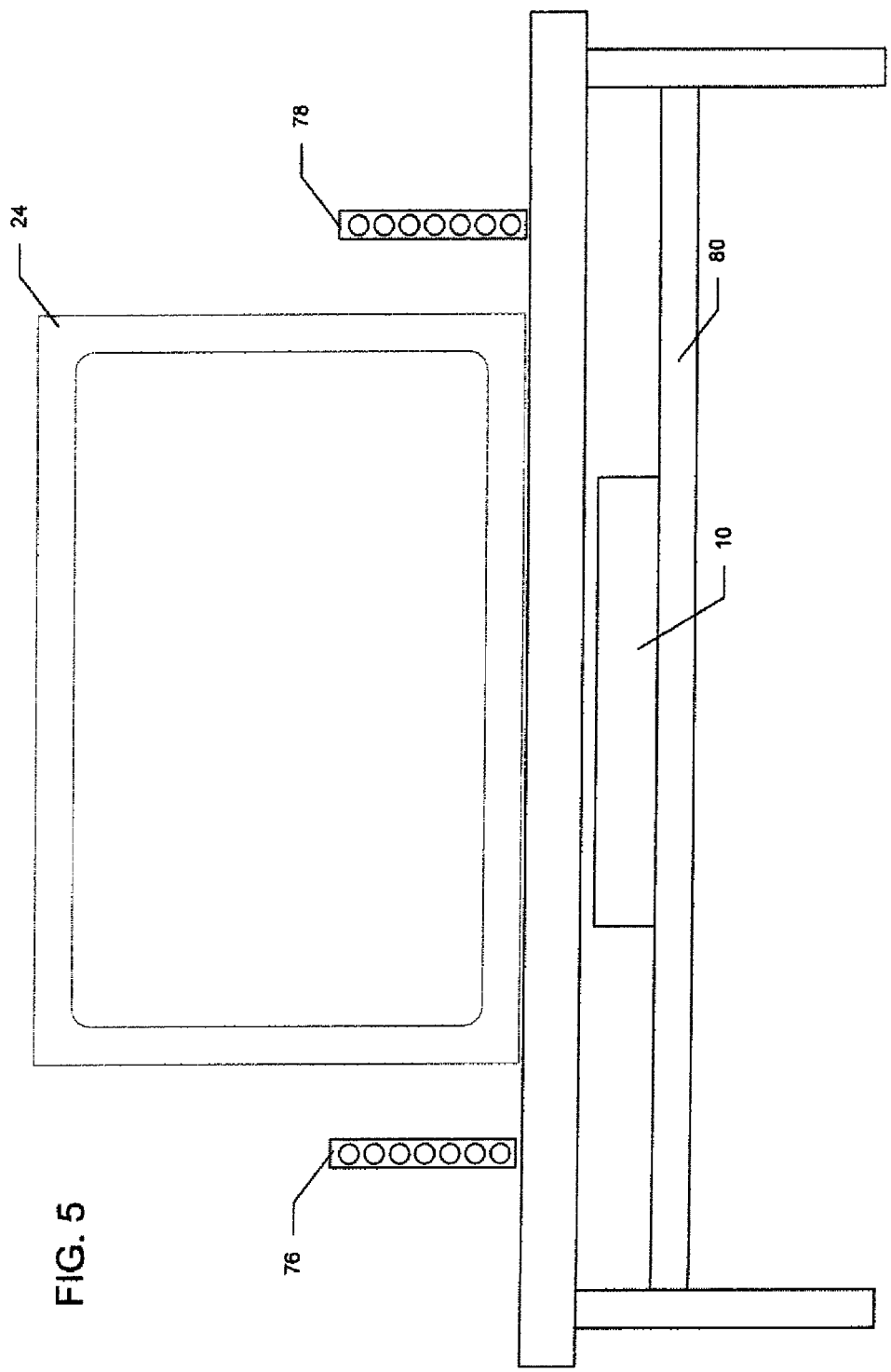

US 8,827,717 B2

PHYSIOLOGICALLY MODULATING VIDEOGAMES OR SIMULATIONS WHICH USE MOTION-SENSING INPUT DEVICES

This application is related to commonly owned U.S. application Ser. No. 13/166,226 entitled TEAM ELECTRONIC GAMEPLAY COMBINING DIFFERENT MEANS OF CONTROL, and to commonly owned U.S. Application Ser. No. 61/499,733, entitled METHOD AND SYSTEM FOR PHYSIOLOGICALLY MODULATING VIDEOGAMES WHICH USE HAND AND BODY MOTION-SENSING DEVICES, both of which are filed concurrently, the entire contents of both of which are incorporated herein by reference in its entirety. This patent application claims the benefit of U.S. Provisional Patent Application No. 61/361,084, filed Jul. 2, 2010.

STATEMENT REGARDING FEDERALLY SPONSORED RESEARCH AND DEVELOPMENT

This invention was made in part with Government support. The Government may have certain rights in this invention.

FIELD OF THE INVENTION

The present invention relates generally to the use of biofeedback to modify a subject's behavior, mental state, and/or physiological functioning. More specifically, the invention relates to apparatus and methods for modulating an operator's control input to an electronic game or simulator, via a motion and/or position-sensing input device, in response to measured physiological activity, such as autonomically-mediated and/or EEG physiological activity, wherein the player thereby learns to control the physiological and/or EEG activity.

BACKGROUND

Physiologically modulated video games add to the entertainment value of video games by adding the challenge of requiring a player to master physiological self-regulation skill as well as hand-eye coordination. Thus, controlling the physiological state, or learning to self-induce physiologic changes, is an additional skill requirement or challenge added to games. Although physiologically modulated videogames have entertainment value by making games more exciting, they also have advantages for encouraging health-enhancing physiological self-regulation skills or for therapeutic amplification of healthful physiological characteristics. Biofeedback, an effective treatment for various physiological problems, can be used to optimize physiological functioning in many ways. The benefits of biofeedback can, however, only be attained through a number of training sessions, and such gains can only be maintained over time through regular practice. Adherence to regular training, especially at home, has been a problem that has plagued the field of biofeedback and limited its utility to date. U.S. Pat. No. 6,450,820, which is incorporated herein by reference thereto, addressed this to a degree, by blending biofeedback into video games, which increases motivation. Biofeedback-modulated video games employing the technology of U.S. Pat. No. 6,450,820 are games that respond to physiological signals as well as mouse, joystick or game controller input; these games embody the concept of improving physiological functioning by rewarding specific healthy body signals with success at playing a video game. Such a biofeedback-modulated game method blends biofeedback into popular off-the-shelf video games in such a way that the games do not lose their entertainment value. This method uses physiological signals (e.g., electroencephalogram frequency band ratio) not simply to drive a biofeedback display directly, or periodically modify a task as in other systems, but to continuously modulate parameters (e.g., game character speed and mobility) of a game task in real time while the game task is being performed by other means (e.g., a game controller). Biofeedback-modulated video games represent a new generation of computer and video game environments that train valuable mental skills beyond eye-hand coordination. These psychophysiological training technologies are poised to exploit the revolution in interactive multimedia home entertainment for the personal improvement, not just the diversion, of the user. The technology of U.S. Pat. No. 6,450,820 modulates the manual inputs that a player makes to the buttons or joysticks of a video game hand controller. This modulation is based on measurements of physiological signals of the player.

However, a new type of video game (illustrated in FIG. 1) has a game controller that allows a player to make inputs to a video game by moving the entire controller itself. This capability is accomplished in operator-controlled game input devices, including the Nintendo wireless Wii remote using accelerometers, and an infrared LED tracking camera, and/or the remote's accessories (e.g., the Nintendo Nunchuk and MotionPlus devices using accelerometers and gyroscopes) (Nintendo, Wii and MotionPlus are registered trademarks of Nintendo of America Inc.) The video game system of FIG. 1 comprises a game console 10, a controller or input device 12, a display 24 (such as a television), and left and right sensor bars 26, 28 (note, while the left and right sensor bars are illustrated as separate devices, in practice the left and right sensor bars are often incorporated into a single device having left and right portions). The game input device 12 comprises one or more gyroscopes 18 and one or more accelerometers 16 for sensing movement of the input device, an infrared receiver or camera 20 for detecting the infrared light emitting diodes (LEDs) of the sensor bars, a transmitter 22 (e.g., Bluetooth) for communicating with the console 10, user input devices (e.g., buttons, etc.) (not illustrated), and a processor 14 for processing the inputs to the game input device and controlling outputs from the game input device. The game system uses the known positional relationship between the left and right sensor bars to determine the game input device's approximate distance from the sensor bars and the input device's position and/or motion relative to the sensor bars.

However, the art described in U.S. Pat. No. 6,450,820, requires further advancement to work with these wireless controllers.

SUMMARY OF THE INVENTION

A new type of controller allows a player to make inputs to a video game or simulation by moving the entire controller itself. This capability is typically accomplished using operator controlled input devices having accelerometers, gyroscopes, and infrared LED tracking cameras. The present invention exploits these wireless motion-sensing technologies to modulate the player's movement inputs to the videogame based upon physiological signals.

In another embodiment of the invention, a method is provided for modifying the effect of an operator controlled input device on an interactive device to encourage the self-regulation of at least one physiological activity by the operator. The operator controlled input device has motion and/or position-sensing capability. The interactive device comprises a display area which depicts images, and apparatus for receiving at least one input from the operator controlled input device to thus permit the operator to control and interact with at least some of the depicted images. The method for modifying comprises the steps of measuring at least one physiological activity of the operator to obtain at least one physiological signal having a value indicative of the level of the at least one physiological activity; and modifying the motion and/or position sensing capability of the operator controlled input device in response to (a) changes in the measured at least one physiological signal and/or (b) differences between the measured at least one physiological signal and a corresponding predetermined desired physiological signal level, thereby modifying the ability of the operator to control and interact with at least some of the depicted images.

Modifying the motion and/or position sensing capability of the operator controlled input device may comprise modulating a voltage input to one or more motion and/or position-sensing elements of the input device. The one or more motion and/or position-sensing elements may comprise one or more accelerometers and/or one or more gyroscopes.

Modifying the motion and/or position sensing capability of the operator controlled input device may comprise modifying one or more position reference signal elements that are used by the input device to determine a motion or position of the operator controlled input device relative to the one or more position reference signal elements. The one or more position reference signal elements may comprise two light emitting diodes (LEDs) or two sets of LEDs having a fixed distance therebetween. The operator controlled input device may comprise a light detector for detecting light emitted from the LEDs. Modifying one or more position reference signal elements may comprise mechanically translating the two LEDs or two sets of LEDs from a first position to a second position, the difference between the first and second positions being based on either (a) the difference between the measured at least one physiological signal and the corresponding predetermined desired physiological signal level, or (b) the measured at least one physiological signal.

The one or more position reference signal elements may comprise a plurality of LEDs, two of which emit light at any particular time. The operator controlled input device may comprise a light detector for detecting light emitted from the LEDs. Modifying one or more position reference signal elements may comprise changing which two of the LEDs are emitting light at any particular time. Changing which two of the LEDs are emitting light at any particular time may comprise turning pairs of LEDs on and off in a predetermined pattern based on either (a) the difference between the measured at least one physiological signal and the corresponding predetermined desired physiological signal level, or (b) the measured at least one physiological signal.

The plurality of LEDs may comprise two groups of linearly arranged LEDs, each of the two linearly arranged groups being positioned substantially horizontally. Alternatively, the plurality of LEDs may comprise two groups of linearly arranged LEDs, each of the two linearly arranged groups being positioned substantially vertically. As another alternative, the plurality of LEDs may comprise two groups of LEDs, each of the groups being arranged in two linearly arranged sub-groups, each sub-group of a group crossing the other sub-group at a center of each sub-group and at a perpendicular angle.

Measuring at least one physiological activity may comprise measuring at least one of: autonomically-mediated physiological activity, and brainwave electrical activity. The autonomic physiological activity may comprise at least one of: skin temperature; skin conductance; electrical activity of muscles; blood flow; heart rate; heart rate variability; and respiratory rate. The brainwave electrical activity may comprise at least one of: event-related potentials; and at least one brainwave frequency band; the at least one brainwave frequency band comprising at least one of: (a) theta, (b) alpha, (c) sensorimotor response (SMR) (d) beta, and (e) gamma.

The method may further comprise displaying the at least one physiological signal having a value indicative of the level of the at least one physiological activity. Displaying the at least one physiological signal may comprise displaying and monitoring the physiological signal on a signal display system substantially separate from the interactive device. However, such a separate display can be connected wirelessly, in some instances, to the interactive device.

In addition to the method for modifying the effect of an operator controlled input device on an interactive device to encourage the self-regulation of at least one physiological activity by the operator, as described above, yet other aspects and embodiments of the present invention are directed to an apparatus for modifying the effect of an operator controlled input device on an interactive device to encourage the self-regulation of at least one physiological activity by the operator.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates a block diagram of a video game system that can benefit from embodiments of the present invention;

FIG. 2. illustrates a block diagram of portions of a system for modifying the effect of an operator controlled input device on an interactive device to encourage the self-regulation of at least one physiological activity by the operator, in accordance with embodiments of the present invention;

FIGS. 4 and 5 illustrate potential positioning options for sensor bars of a system for modifying the effect of an operator controlled input device on an interactive device to encourage the self-regulation of at least one physiological activity by the operator, in accordance with alternative embodiments of the present invention;

Figure 8:
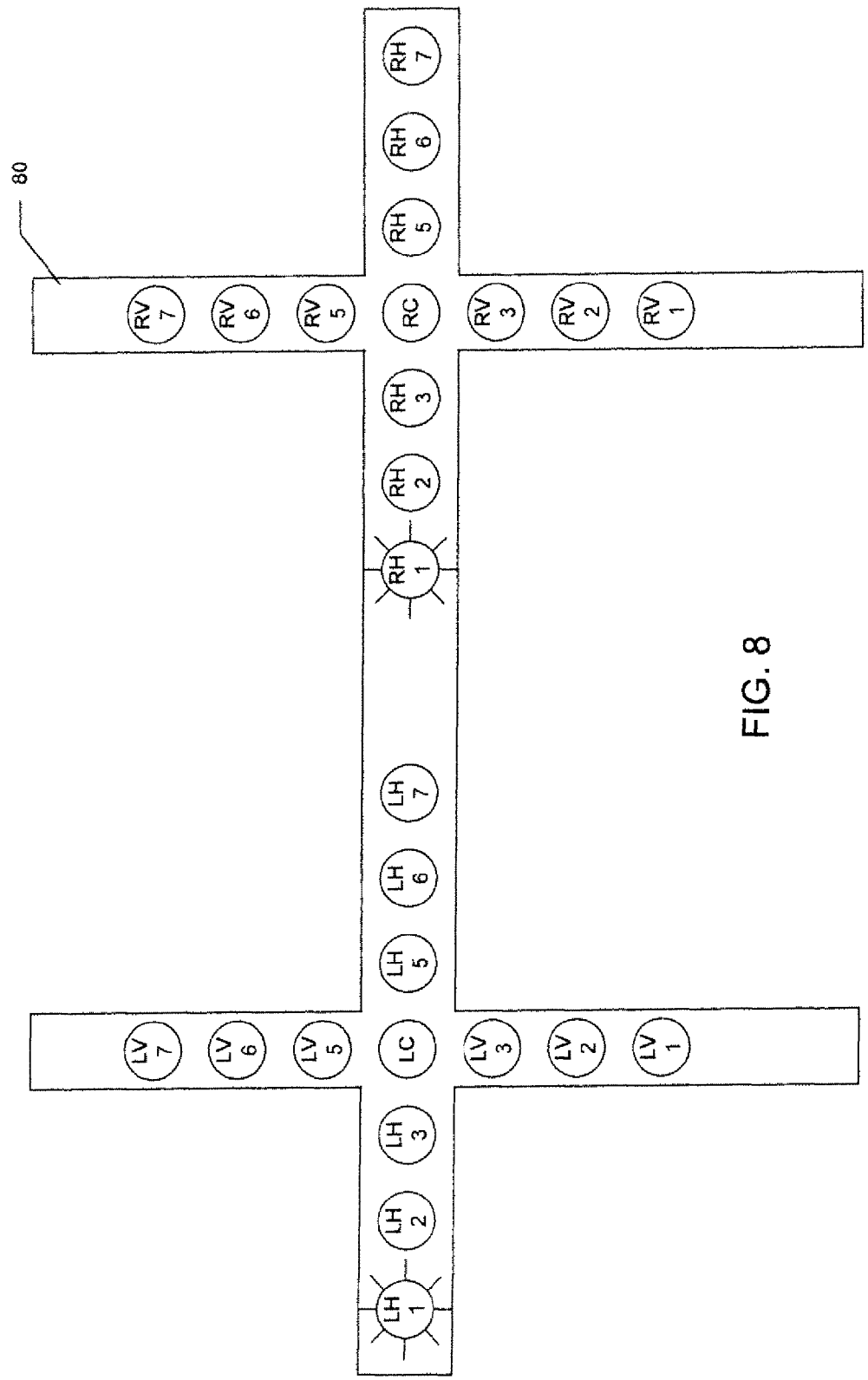
Figure 9:
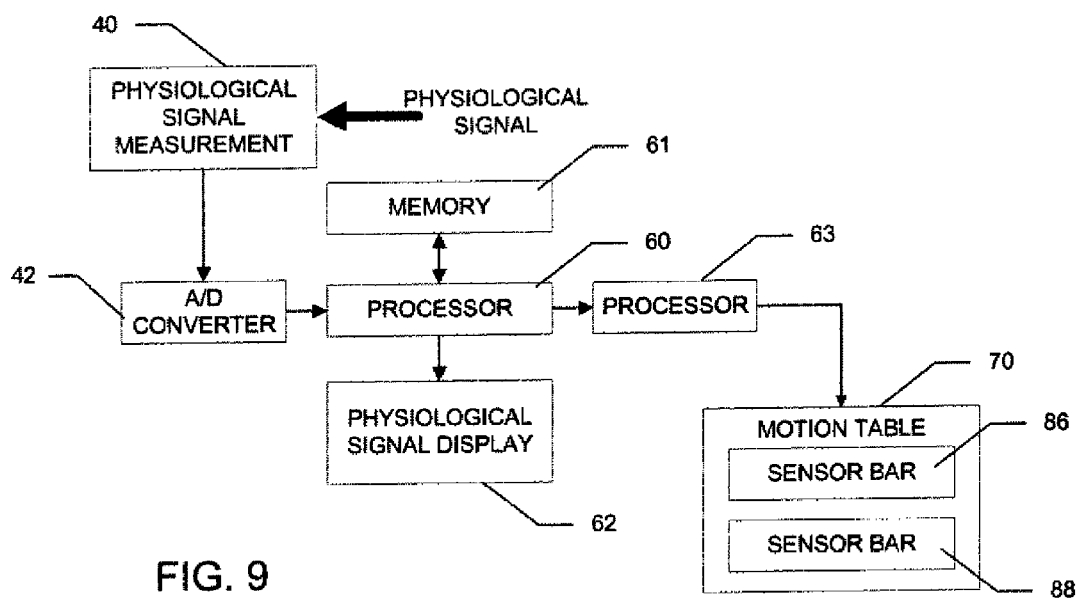

FIGS. 6A-D illustrate one possible lighting pattern for horizontal sensor bars of a system for modifying the effect of an operator controlled input device on an interactive device to encourage the self-regulation of at least one physiological activity by the operator, in accordance with embodiments of the present invention;

FIGS. 7A-D illustrate one possible lighting pattern for vertical sensor bars of a system for modifying the effect of an operator controlled input device on an interactive device to encourage the self-regulation of at least one physiological activity by the operator, in accordance with embodiments of the present invention;

FIG. 8 illustrates an alternative sensor bar of a system for modifying the effect of an operator controlled input device on an interactive device to encourage the self-regulation of at least one physiological activity by the operator, in accordance with embodiments of the present invention; and FIG. 9 illustrates a block diagram of portions of a system for modifying the effect of an operator controlled input device on an interactive device to encourage the self-regulation of at least one physiological activity by the operator, in accordance with alternative embodiments of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A new type of video game controller allows a player to make inputs to a video game or simulation by moving the entire controller itself. This capability is typically accomplished using operator controlled input devices having accelerometers, gyroscopes, and infrared LED tracking cameras. The present invention exploits these wireless motion-sensing technologies to modulate the player's movement inputs to the videogame based upon physiological signals.

Embodiments of the invention modify the effect of an operator controlled input device having motion and/or position-sensing capability. Embodiments of the invention typically measure at least one physiological activity of the operator to obtain at least one physiological signal having a value indicative of the level of the at least one physiological activity; and modify the motion and/or position sensing capability of the operator controlled input device in response to (a) changes in the measured at least one physiological signal and/or (b) differences between the measured at least one physiological signal and a corresponding predetermined desired physiological signal level, thereby modifying the ability of the operator to control and interact with at least some of the depicted images.

Figure 1:
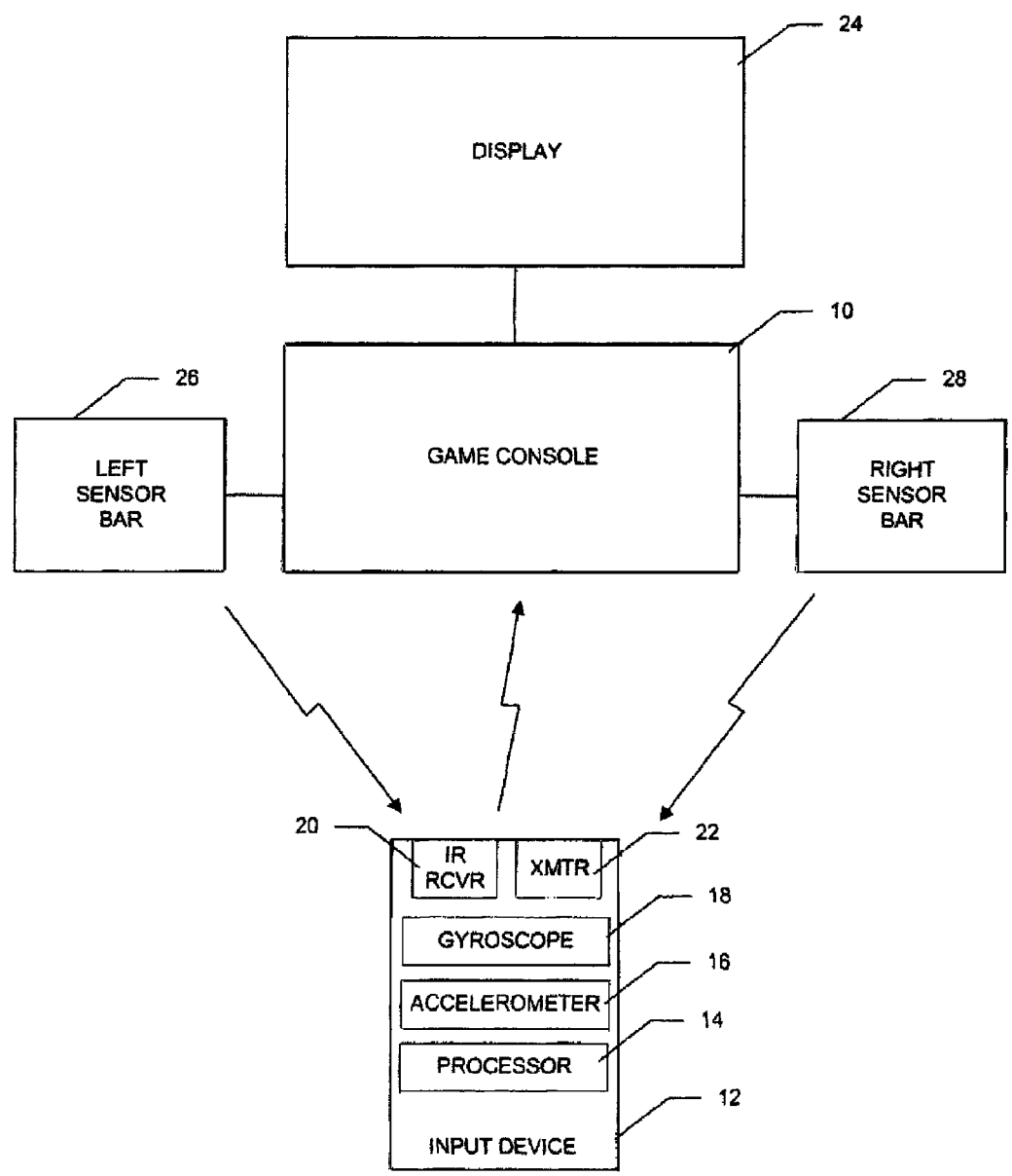
Figure 2:
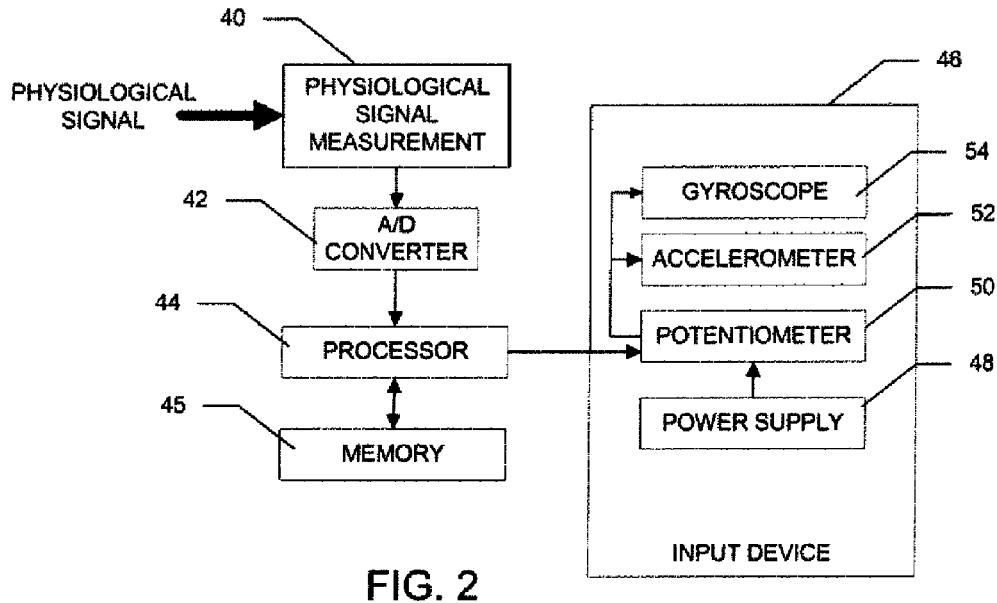

Referring now to FIG. 2, a block diagram of portions of a system for modifying the effect of an operator controlled input device on an interactive device is illustrated in accordance with embodiments of the present invention. In the embodiment of FIG. 2, the voltage input to one or more motion and/or position-sensing elements (e.g., accelerometers and/or gyroscopes) of the input device is modulated (increased or decreased). This modulation of the voltage that powers the accelerometers and/or gyroscopes in operator controlled input devices changes (increasing or reducing) the effect of the player's movement of the controller on the player-controlled object on the screen. The degree of the increase or reduction may be programmed to be proportional to the difference between the player's current momentary physiological signal value and a pre-selected target value. In this way, the player is rewarded for diminishing this difference by an improved ability to control the player-controlled object (e.g., a cursor) on the screen and/or increased power in the action of the player-controlled object on the screen (e.g., a golf club).

The system of FIG. 2 comprises a physiological signal measurement device 40 that receives physiological signal information from an operator of the system. One or more of a wide variety of different measured physiological signals can be used in accordance with the present invention, for example, electroencephalogram (EEGs), skin temperature, skin conductance, heart rate, and/or event-related potentials (ERPs). U.S. Pat. No. 5,377,100, issued on Dec. 27, 1994 to Pope et al., and which is incorporated herein by reference in its entirety, at column 3, line 8 to column 5, line 60 details a method for determining an individual's EEG index of attention, which index can be used to assess his or her mental engagement in a task. Industry-standard methods and devices for measuring these physiological signals may be used as the physiological signal measurement device 40, including but not limited to an electroencephalograph, a thermometer, a galvanic skin response device, an electromyogram, and/or an cardiotachometer. The physiological signal measurement device 40 in conjunction with the analog-to-digital converter 42 and processor 44 may (1) sample amplified and processed physiological signals (e.g., electromyogram measuring muscular tension), (2) test the signal levels with programmed conditional instructions stored in memory 45 (and possibly compare the signal levels with predetermined desired signal levels stored in memory 45), and, in accordance with the physiological signal condition determinations, (3) dynamically adjust digitally controlled potentiometers 50 that are configured as voltage dividers to modulate the voltage from power supply 48 that powers the accelerometers 52 and/or gyroscopes 54. FIG. 2 illustrates a single potentiometer that modulates the voltage to both a single accelerometer and a single gyroscope. In alternative embodiments of the invention, separate potentiometers may be used with each accelerometer and each gyroscope, and multiple accelerometers and/or or multiple gyroscopes may be used in the game input device 46. In a yet further alternative embodiment, one or more accelerometers may be modulated with a single potentiometer and one or more gyroscopes may be modulated with a separate, single potentiometer. One, a plurality of, or all of the accelerometers and/or gyroscopes may be so modulated.

Figure 3:
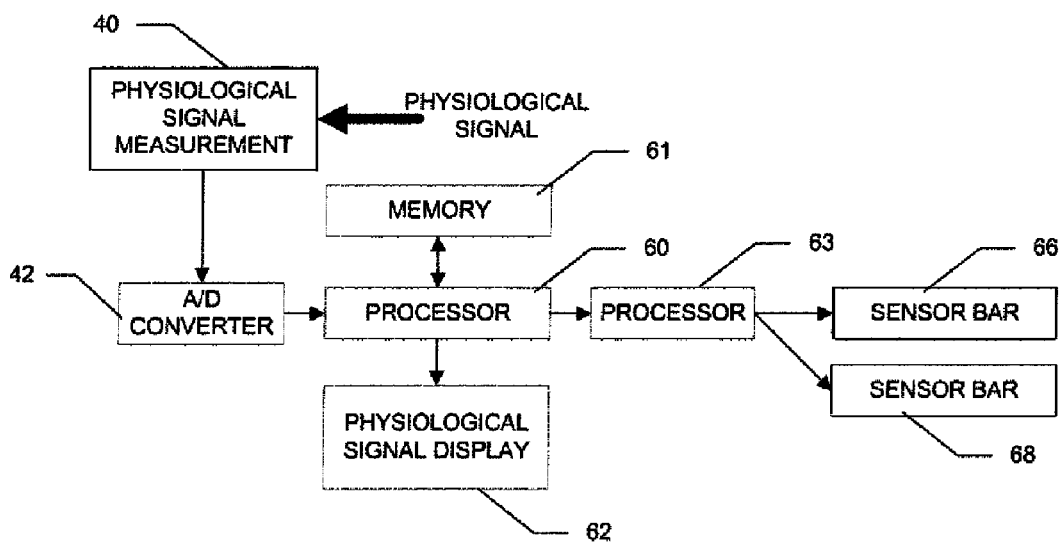
FIG. 3 illustrates a block diagram of portions of a system for modifying the effect of an operator controlled input device on an interactive device to encourage the self-regulation of at least one physiological activity by the operator, in accordance with alternative embodiments of the present invention.

Referring now to FIG. 3, a block diagram of portions of a system for modifying the effect of an operator controlled input device on an interactive device is illustrated in accordance with alternate embodiments of the present invention. In the embodiment of FIG. 3, modification is made to one or more position reference signal elements that are used by the input device to determine a motion or position of the operator controlled input device relative to the one or more position reference signal elements. These position reference signal elements are commonly referred to as "sensor bars." The one or more sensor bars each comprise a plurality of LEDs, two of which emit light at any particular time (typically one from each sensor bar). (Note, the sensor bars are described herein as separate physical devices, each having a plurality of LEDs. However, embodiments of the invention may comprise sensor bars that are combined in a single physical device, with two sets of LEDs separated by a distance.) The operator controlled input device comprises a light detector for detecting light emitted from the LEDs.

In this embodiment, the standard sensor bar of the video game system is replaced with an array of infrared LEDs that are individually controllable on and off. This embodiment of the invention turns LEDs in the array on and off in dynamic patterns to produce a disturbance in the player-directed control of the infrared-sensing videogame controller, resulting in a disruption in the stability of the player-controlled object (e.g., a cursor) on the screen. The degree of the disruption is programmed to be proportional to the difference between the player's current momentary physiological signal value and a pre-selected target value. In this way, the player is rewarded for diminishing this difference by an improved ability to accurately position the player-controlled object (e.g., a cursor) on the screen.

In the embodiment of FIG. 3, modifying one or more position reference signal elements comprises changing which two of the LEDs (typically one from each sensor bar) are emitting light at any particular time. This typically involves turning pairs of LEDs on and off in a predetermined pattern based on either (a) the difference between the measured at least one physiological signal and the corresponding predetermined desired physiological signal level, or (b) the measured at least one physiological signal.

The plurality of LEDs may comprise two groups of linearly arranged LEDs, each of the two linearly arranged groups being positioned substantially horizontally. This arrangement is illustrated in FIG. 4, which shows the two sensor bars 66, 68 spaced apart and on alternate sides of the television 24. Also illustrated is the game console 10, and all of the components are supported on a table 80. As mentioned above, the two sensor bars may be combined into a single physical device. Alternatively, the plurality of LEDs may comprise two groups of linearly arranged LEDs, each of the two linearly arranged groups being positioned substantially vertically. This arrangement is illustrated in FIG. 5, which shows the two sensor bars 76, 78 spaced apart and on alternate sides of the television 24. Also illustrated is the game console 10, and all of the components are supported on a table 80. As mentioned above, the two sensor bars may be combined into a single physical device. As another alternative, the plurality of LEDs may comprise two groups of LEDs, each of the groups being arranged in two linearly arranged sub-groups, each sub-group of a group crossing the other sub-group at a center of each sub-group and at a perpendicular angle. This embodiment is illustrated in FIG. 8 (discussed in more detail below).

The system of FIG. 3 comprises a physiological signal measurement device 40 that receives physiological signal information from an operator of the system (as described above). The physiological signal measurement device 40 in conjunction with the analog-to-digital converter 42 and processor 60 may (1) sample amplified and processed physiological signals (e.g., cardiotachometer measuring heart rate), (2) test the signal levels with programmed conditional instructions stored in memory 61 (and possibly compare the signal levels with predetermined desired signal levels stored in memory 61), and, in accordance with the physiological signal condition determinations, (3) turning on infrared LEDs in dynamic patterns to produce the described effects on the player-directed control of an infrared-sensing videogame controller.

One example implementation involves positioning one horizontal row of LEDs, e.g., 7 LEDs, in front and to the right of the player who is manipulating the input device, and another row in front and to the left of the player (as illustrated in FIG. 4). The corresponding LED in each row is simultaneously illuminated and turned on and off in synch to create a running marquee effect. This effect results in horizontally sweeping the infrared camera's two reference points used to position the cursor on the screen, producing a disruption in the stability of the player-controlled object (e.g., a cursor) on the screen. The length of the marquee run, and, consequently, the degree of the disruption, may be programmed to be proportional to the difference between the player's current momentary physiological signal value and a pre-selected target value. In this way, the player is rewarded for diminishing this difference by an improved ability to accurately position the player-controlled object (e.g., a cursor) on the screen.

More specifically, one example implementation involves processor 60 continuously sampling an integrated EMG signal, serially communicating those values to second processor 63 which reads a serial value at the initiation of each sweep of LED rows and/or columns, and controlling the timing and sweep amplitude of a marquee-like illumination of the LEDs. Another specific example implementation involves processor 60 sampling a heart rate signal (cardiotachometer), serially communicating those values to second processor 63 which reads a serial value at the initiation of each heart beat, and controlling the timing and sweep amplitude of a marquee-like illumination of the LEDs.

Figure 6A:
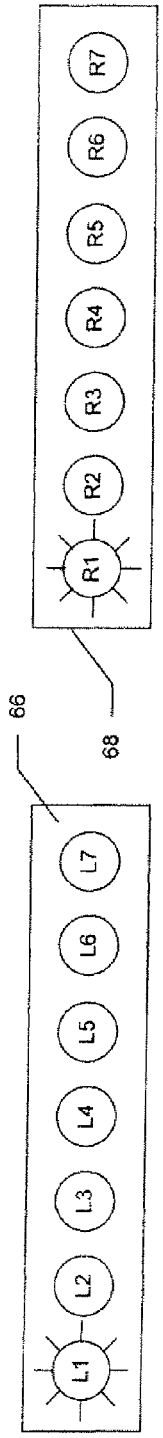
Figure 6B:
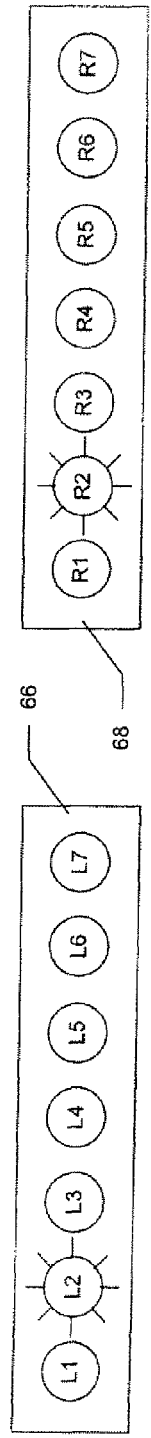
Figure 6C:
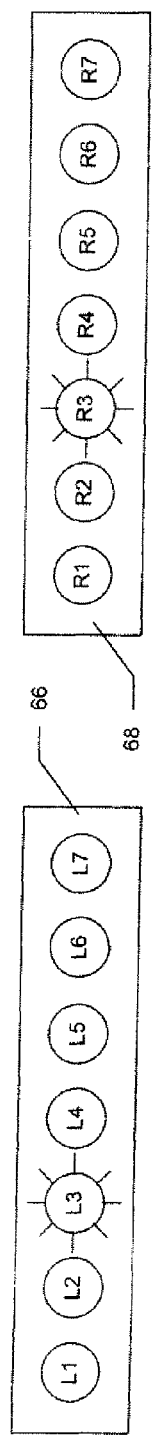
Figure 6D:
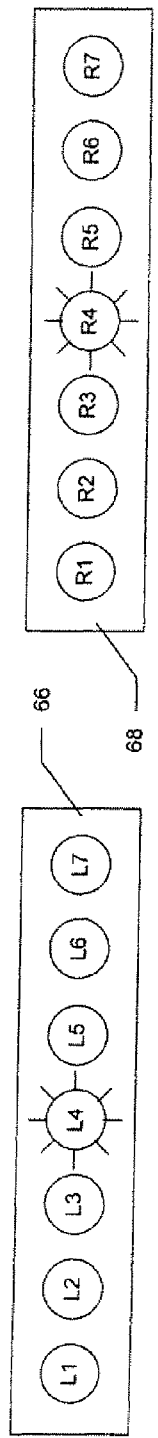

In the above two examples, the individual LEDs in each sensor bar are turned on and off in sequence (left to right or right to left) to create a marquee-like sweep. This is illustrated in FIGS. 6A-D. FIGS. 6A-D illustrate two horizontal sensor bars 66, 68, each comprising seven linearly arranged LEDs (labeled L1-L7 for the left sensor bar 66 and R1-R7 for the right sensor bar 68). First, LEDs L1 and R1 are illuminated (FIG. 6A). Then, L1 and R1 are turned off and L2 and R2 are illuminated (FIG. 6B). Then, L2 and R2 are turned off and L3 and R3 are illuminated (FIG. 6C). Finally, L3 and R3 are turned off and L4 and R4 are illuminated (FIG. 6D). This creates a left-to-right marquee sweep, which causes the input device to interpret that it is being moved erratically when in fact it is not. The speed and/or extent of the marquee-like sweep may be varied, for example in proportion to the difference between the player's current momentary physiological signal value and a pre-selected target value. The specific pattern used may vary considerably in alternative embodiments of the invention.

In another example embodiment, the infrared LEDs that the infrared camera uses to track the movement of the input device are oscillated back and forth horizontally, causing an oscillation to be superimposed on the player's movements of the input device and reflected in the movements of the player-controlled object (e.g., a cursor) on the game screen. For example, the LEDs may be illuminated in a sequence such as: L4/R4. L3/R3, L2/R2, L3/R3, L4/R4, L5/R5, L6/R6, L5/R5, and L4/R4. The amplitude and/or speed of the oscillations may be programmed to be proportional to the difference between the player's current momentary physiological signal value and a pre-selected target value. This results in an unsteadiness in the player's ability to control the player-controlled object (e.g., a cursor), which diminishes as the difference between the player's current momentary physiological signal value and a pre-selected target value diminishes.

In another example embodiment, the infrared LEDs that the infrared camera uses to track the movement of the input device are swept up and down vertically, causing an oscillation to be superimposed on the player's movements of the input device and reflected in the movements of the player-controlled object (e.g., a cursor) on the game screen. The amplitude and/or speed of the sweeps may be programmed to be proportional to the difference between the player's current momentary physiological signal value and a pre-selected target value. This results in an unsteadiness in the player's ability to control the player-controlled object (e.g., a cursor), which diminishes as the difference between the player's current momentary physiological signal value and a preselected target value diminishes. One particular implementation involves positioning one vertical column of LEDs, e.g., 7 LEDs, in front and to the right of the player who is manipulating the input device, and another row in front and to the left of the player (as illustrated in FIG. 5). The corresponding LED in each column is simultaneously illuminated and turned on and off in synch to create a running marquee effect. This effect results in vertically sweeping the infrared camera's two reference points used to position the player-controlled object (e.g., a cursor) on the screen, producing a disruption in the stability of the player-controlled object (e.g., a cursor) on the screen.

Figure 7A:
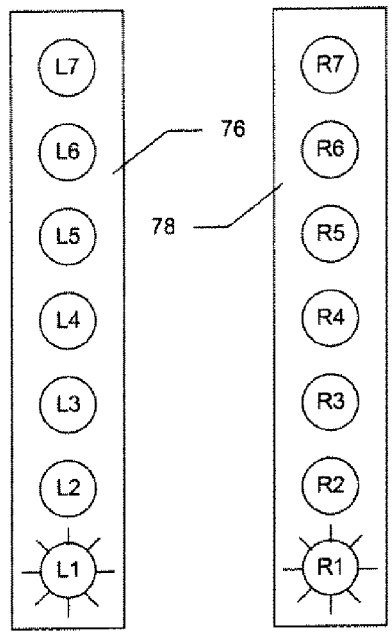
Figure 7B:
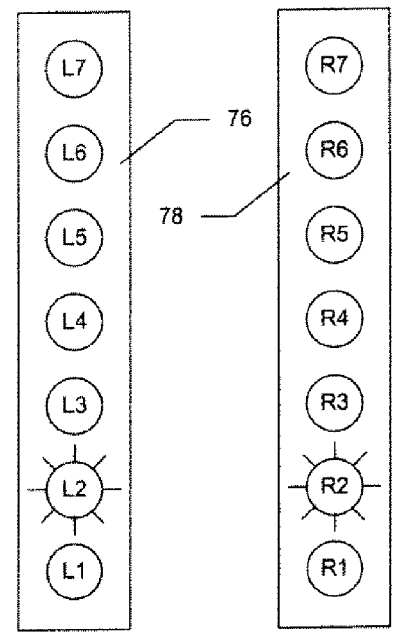
Figure 7C:
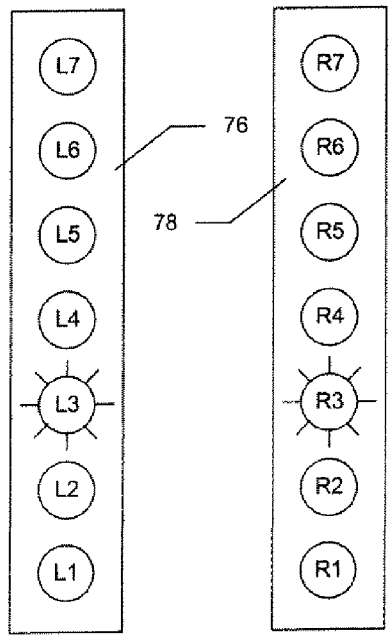
Figure 7D:
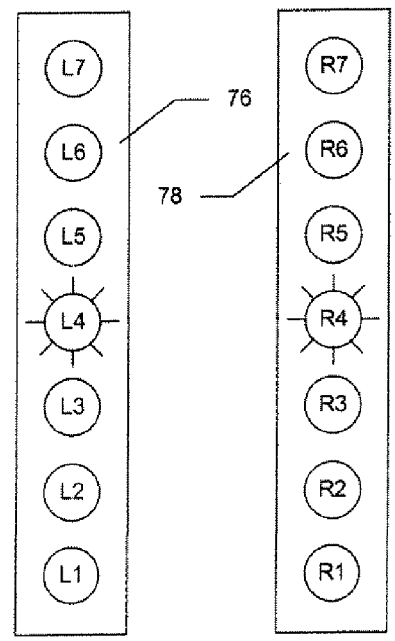

This is illustrated in FIGS. 7A-D. FIGS. 7A-D illustrate two vertical sensor bars 66, 68, each comprising seven linearly arranged LEDs (labeled L1-L7 for the left sensor bar 76 and R1-R7 for the right sensor bar 78). First, LEDs L1 and R1 are illuminated (FIG. 7A). Then, L1 and R1 are turned off and L2 and R2 are illuminated (FIG. 7B). Then, L2 and R2 are turned off and L3 and R3 are illuminated (FIG. 7C). Finally, L3 and R3 are turned off and L4 and R4 are illuminated (FIG. 7D). This creates a bottom-to-top marquee sweep, which causes the input device to interpret that it is being moved erratically when in fact it is not. The speed and/or extent of the marquee-like sweep may be varied, for example in proportion to the difference between the player's current momentary physiological signal value and a pre-selected target value. In this way, the player is rewarded for diminishing this difference by improved ability to accurately position the player-controlled object (e.g., cursor) on the screen. The sweeps may be continuous up and down oscillations whose amplitude is proportional to the player's difference signal as above. Or each sweep may be initiated on each heart beat and sweep up, or both up and down, to an amplitude proportional to the difference between the player's current momentary heart rate value and a pre-selected target value. If the goal of training is to achieve a preselected target heart rate, represented by illumination of the LEDs in the middle of each column, the LEDs in each column may be programmed to sweep up to the appropriate LED from the LED in the middle of each column, then down to the appropriate LED below the middle of each column then return to the middle LED, the amplitude of each sweep being proportional to the difference between the player's current momentary heart rate value and a pre-selected target value. For example, the LEDs may be illuminated in a sequence: L4/R4, L3/R3, L2/R2, L3/R3. L4/R4, L5/R5, L6/R6, L5/R5, and L4/R4.

The target heart rate may be determined in any of a number of ways—two examples are: (1) the target value may be input prior to game play or (2) the target value may be computed as a baseline average over N heart beats before the beginning of or during a selected period of game play. The target value could be programmed to change as the player progresses through the game. If the goal of training is simply to lower heart rate, the pre-selected target value would be, in essence, zero, and the LEDs in the column are programmed to sweep up from the bottom LED to an amplitude proportional to the player's momentary heart rate, then back down to the bottom LED. If the goal of training is to increase heart rate variability, the difference between the current momentary heart rate and the immediately preceding heart rate, or an average heart rate over N preceding heart beats, is calculated in real time and the amplitude of the vertical LED sweeps are made inversely proportional to that difference. The sweeps may correspond to the direction of the heart rate change, that is, heart rate increases produce sweeps up and decreases produce sweeps down, or the sweeps may be opposite in direction to the heart rate change, or the sweeps may be in either direction proportional to the absolute value of the heart rate change.

In an additional embodiment, illustrated in FIG. 8, the LED rows and columns are superimposed in a configuration 90 that resembles an "H", but with a crossbar comprising two co-linear 7-LED horizontal rows centered on the verticals of the "H". This arrangement creates two symmetrical crosses of LEDs with horizontal and vertical radials of 3 LEDs each, emanating from center LEDs. Corresponding LEDs on the radials of each cross (i.e., a pair of LEDs) may be turned on in clockwise sequence (right horizontal, bottom vertical, left horizontal and top vertical radials for each rotation) so as to create a dynamic rotational pattern that encircles the center (LC and RC) of each cross. Such a clockwise sequence of illumination might, for example, illuminate the following pairs of LEDs in sequence: LH7/RH7, then LV1/RV1, then LH1/RH1, and then LV7/RV7. This illumination sequence of the LEDs creates a corresponding movement pattern of the player-controlled object (e.g., a cursor) on the screen, producing a disruption in the stability of the player-controlled object (e.g., a cursor) on the screen. The radial position (i.e., how far away from the center LED) of the illuminated LEDs and, consequently, the radius of the circumscribed rotational pattern and, consequently, the degree of the disruption, may be programmed to vary in proportion to the difference between the player's current momentary physiological signal value and a pre-selected target value. In one embodiment, the radial position of the illuminated LED, determined from the previously defined physiological signal difference, is the same, i.e., the same distance from the center on the right horizontal, the bottom vertical, the left horizontal and the top vertical radials, for each rotation about the center, creating a symmetrical diamond rotational pattern. In an alternate embodiment, the radial position is determined from the physiological signal difference for each individual radial in clockwise rotation, and may vary from radial to radial, creating a swirling rotational pattern. In another alternate embodiment, the radial rotation is limited to three of the four radials, resulting in a triangular rotational pattern whose size and, consequently, the degree of the disruption, may be programmed to vary in proportion to the difference between the player's current momentary physiological signal value and a pre-selected target value. The apex of this rotating triangular pattern, the farthest vertex from the horizontal side, may be above or below the horizontal side, indicating that the momentary physiological signal value exceeds or falls below, respectively, a pre-selected target value.

In an embodiment using the sensor bar 80 of FIG. 8, these functions may be implemented with three programmable microcontrollers or processors. One processor may perform three functions: (1) controlling analog to digital converter components to sample amplified and processed physiological signals (e.g., from a cardiotachometer measuring heart rate); (2) testing the signal levels with programmed conditional instructions, and, in accordance with the physiological signal condition determinations; (3) sending a radial position value (0, 1, 2 or 3) to both of the two other processors. One of the receiving processors may control the two co-linear horizontal rows of seven LEDs each in the "H" configuration described above; the other receiving processor may control the two vertical columns of seven LEDs each. The two receiving processors engage in back and forth handshaking to turn on corresponding LEDs (i.e., a pair of LEDs) on the radials of each of the two crosses described above in clockwise sequence (right horizontal, bottom vertical, left horizontal and top vertical radials for each rotation) so as to create a dynamic rotational pattern.

In another alternative embodiment, the sensor bars (which, again, may be a single device or separate devices) may comprise two light emitting diodes (LEDs) or two sets of LEDs having a fixed distance therebetween. The LEDs may be mechanically translated from a first position to a second position. This may be accomplished by moving the sensor bars themselves, or by mechanically moving the LEDs within each sensor bar. The first alternative is illustrated in FIG. 9, in which the sensor bars 86, 88 are mounted on a motion table 70 that may be configured to move the sensor bars, in unison or separately, horizontally, vertically, or diagonally. The difference between the first and second positions may be based on either (a) the difference between the measured at least one physiological signal and the corresponding predetermined desired physiological signal level, or (b) the measured at least one physiological signal. The measurement and analysis of the physiological signal is similar to that of the embodiment of FIG. 3. More specifically, one example implementation involves processor 60 continuously sampling a physiological signal, serially communicating those values to second processor 63 which controls the mechanical movement of the sensor bars via the motion table.

The function of the invention may be accomplished by using the physiological signals of the player, the signals of another participant who is not handling a videogame controller, or the physiological signals of one player to modulate the controller of an opposing player.

Embodiments of the invention may employ the integrated EMG signal, and the heart rate (cardiotachometer) signal. Additional embodiments may employ brainwave signals, specifically an "engagement index" derived from brainwave signals, defined in Pope, Bogart and Bartolome (Pope, A. T., Bogart, E. H., and Bartolome, D. S. (1995). Biocybernetic System Validates Index of Operator Engagement in Automated Task. *Biological Psychology*, 40, 187-195), the contents of which are incorporated herein in its entirety. Other physiological signals that may be used include, but are not limited to, skin conductance signals, skin temperature signals and respiration signals.

A noise-reducing enhancement may be desired for obtaining electrical heart signal. The heart rate signal may be derived from a photoplethysmograph sensor or electrocardiogram electrodes. One convenient method for obtaining the electrocardiogram heart signal is the use of chest band electrodes in combination with a wireless transmitter (e.g., Polar Model T31 from Polar Electro USA). Such a technology minimizes movement artifact (electrical noise) and enables the invention to be used conveniently with the active and exercise games popular on the video game systems.

In addition to the methods described above are the following methods of superimposing movements on the player's control of in-game objects (e.g., a cursor, character) on the screen, producing a disruption in the stability of the player-controlled object (e.g., a cursor, character) on the screen and/or modulation of game feedback signals that vary in proportion to either (a) the difference between the measured at least one physiological signal and the corresponding predetermined desired physiological signal level, or (b) the measured at least one physiological signal:

1. Physiological signals can be used to modulate a momentary illumination of off-center LEDs in the sensor bars resulting in a brief change (bump) in the reference position for the position/motion of the input device.

2. Physiological signals can be used to modulate the magnitude of a superimposed momentary displacement (bump) to control inputs in the input device (buttons, joysticks, accelerometers and/or gyroscopes). These displacements may be superimposed upon ongoing inputs a player provides to the game (movement in all directions, jump, accelerate). The displacements may also function as additional inputs to the game without input from the player (e.g., firing a weapon).

3. Physiological signals can be used to simultaneously modulate the magnitude of a superimposed momentary displacement (bump) of more than one control input.

4. Multiple physiological signals can be combined to modulate the magnitude of a superimposed momentary displacement (bump) of a single control input. Multiple physiological signals can be used to simultaneously modulate the magnitude of a superimposed momentary displacement (bump) of more than one control input.

5. Physiological signals can be combined with the tactile (haptic) and/or auditory signals of the input device, for example, to produce a momentary displacement (bump) in or slowing of the movement of the player's character on screen.

6. Physiological signals can be used to modulate the effect of the tactile (haptic) and auditory signals delivered to the player through the game input device and/or audio output of the game console.

In at least one advantageous and exemplary embodiment, including but not limited to the LED embodiments described above, the current invention interacts wirelessly with a Wii remote through infrared transmission, and has the unique advantage of not requiring direct connection or wiring into the Wii video game or access to the Wii system software or firmware.

In other exemplary embodiments, the challenge of various games can be enhanced by attenuation (joystick, button and/or motion-control dampening or perturbation) and/or by disruption (cursor movement modulation). Such outside controls, focus on overt acts for systems like the Wii motion-control or the MS Kinect motion detector, while working with inside controls and covert acts through body behaviors and such like NASA's MindShift (demonstrated in 2010 using a sensor attached to the player's earlobe, checking the pulse and wired into the control or sensors attached to the forehead, seeking the facial muscle strain that is a sign of stress). Accordingly, in certain examples, psycho-physiological modulation of gameplay can be implemented in conjunction with the Wii system games, including but not limited to, first person shooter games where cross hairs position and point of view modifications are used. Alternative games can include without limitation, medical simulations using cursor position modification to teach stress management during medical procedures; sports simulations such as for instance golf swing strength, modulation and ball control; and racing games where vehicle steering attenuation is contemplated.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for modifying the effect of an operator controlled input device on an interactive device to encourage the self-regulation of at least one physiological activity by the operator, the operator controlled input device utilizing one or more position reference signal elements to provide motion and/or position-sensing capability relative to the one or more position reference signal elements, the interactive device comprising a display area that depicts images and an apparatus for receiving at least one input from the operator controlled input device to thus permit the operator to control and interact with at least some of the depicted images, the method for modifying comprising the steps of:

measuring at least one physiological activity of the operator to obtain at least one physiological signal having a value indicative of the level of the at least one physiological activity; and modifying the motion and/or position sensing capability of the operator controlled input device by modifying one or more position reference signal elements in response to (a) changes in the measured at least one physiological signal and/or (b) differences between the measured at least one physiological signal and a corresponding predetermined desired physiological signal level, thereby modifying the ability of the operator to control and interact with at least some of the depicted images, wherein the one or more position reference signal elements comprise a plurality of LEDs, two of which emit light at any particular time; wherein the operator controlled input device comprises a light detector for detecting light emitted from the LEDs, and wherein the step of modifying one or more position reference signal elements comprises the step of changing which two of the LEDs are emitting light at any particular time.

2. The method of claim 1, wherein the step of changing which two of the LEDs are emitting light at any particular time comprises turning pairs of LEDs on and off in a predetermined pattern based on either (a) the difference between the measured at least one physiological signal and the corresponding predetermined desired physiological signal level, or (b) the measured at least one physiological signal.

3. The method of claim 1, wherein the plurality of LEDs comprises two groups of linearly arranged LEDs, each of the two linearly arranged groups being positioned substantially horizontally.

4. The method of claim 1, wherein the plurality of LEDs comprises two groups of linearly arranged LEDs, each of the two linearly arranged groups being positioned substantially vertically.

5. The method of claim 1, wherein the plurality of LEDs comprise two groups of LFDs, each of the groups being arranged in two linearly arranged sub-groups, each sub-group of a group crossing the other sub-group at a center of each sub-group and at a perpendicular angle.

6. The method of claim 1, wherein the at least one physiological signal comprises at least one or more of skin temperature, skin conductance, electrical activity of muscles, blood flow, heart rate, heart rate variability, and respiratory rate.

7. The method of claim 1, wherein the at least one physiological signal comprises at least one or more of brainwave electrical event-related potentials, and at least one brainwave frequency band; wherein the at least one brainwave frequency band comprises at least one or more of: (a) theta, (b) alpha, (c) Sensorimotor Response (SMR), (d) beta, and (e) gamma.

8. The method of claim 1, further comprising:
displaying the at least one physiological signal having a value indicative of the level of the at least one physiological activity.

9. The method of claim 8, wherein the steps of measuring, modifying, and displaying are performed wirelessly without any direct connection to the operator controlled device and to the interactive device.

10. The method of claim 1, wherein the steps of measuring and modifying are performed wirelessly without any direct connection to the operator controlled device and to the interactive device.

11. An apparatus for modifying the effect of an operator controlled input device on an interface device to encourage the self-regulation of at least one physiological activity by the operator, the operator controlled input device utilizing one or more position reference signal elements to provide motion and/or position-sensing capability relative to the one more position reference signal elements, the interactive device comprising a display area, a processor for depicting images upon the display area, and a receiver device permitting the operator to control and interact with at least some of the depicted images, the modifying apparatus comprising:

at least one measurement device for measuring at least one physiological activity of the operator to obtain at least one physiological signal having a value indicative of the level of the at least one physiological activity; and at least one modifying device for modifying the motion and/or position sensing capability of the operator controlled input device by modifying one or more position reference signal elements in response to (a) changes in the measured at least one physiological signal and/or (b) differences between the measured at least one physiological signal and a corresponding predetermined desired physiological signal level, thereby modifying the ability of the operator to control and interact with at least some of the depicted images, wherein the one or more position reference signal elements comprise two light emitting diodes (LEDs) or two sets of LEDs having a fixed distance therebetween; wherein the operator controlled input device comprises a light detector for detecting light emitted from the LEDs, and wherein the signal modulator comprises a mechanical translator for mechanically translating the two LEDs from a first position to a second position, the difference between the first and second positions being based on either (a) the difference between the measured at least one physiological signal and the corresponding predetermined desired physiological signal level, or (b) the measured at least one physiological signal.

12. The apparatus of claim 11, wherein the at least one physiological signal comprises at least one or more of: skin temperature, skin conductance, electrical activity of muscles, blood flow, heart rate, heart rate variability, and respiratory rate.

13. The apparatus of claim 12, wherein the measurement device is a chest band electrode in combination with a wireless transmitter.

14. The apparatus of claim 11, wherein the at least one physiological signal comprises at least one or more of: brainwave electrical event-related potentials, and at least one brainwave frequency band; wherein the at least one brainwave frequency band comprises at least one or more of: (a) theta, (b) alpha, (c) Sensorimotor Response (SMR), (d) beta, and (e) gamma.

15. The apparatus of claim 11, further comprising:
a display sub-area for displaying the at least one physiological signal having a value indicative of the level of the at least one physiological activity.

16. The apparatus of claim 15, wherein the display sub-area is substantially separate from the interactive device.

17. The apparatus of claim 16, wherein the at least one measurement device, the at least one modifying device, and the display sub-area are connected wirelessly without any direct connection to the operator controlled device and to the interactive device.

18. The apparatus of claim 11, wherein the at least one measurement device and the at least one modifying device are connected wirelessly without any direct connection to the operator controlled device and to the interactive device.

19. A method for modifying the effect of an operator controlled input device on an interactive device to encourage the self-regulation of at least one physiological activity by the operator, the operator controlled input device having one or more motion and/or position-sensing elements providing motion and/or position-sensing capability, the interactive device comprising a display area that depicts images and an apparatus for receiving at least one input from the operator controlled input device to thus permit the operator to control and interact with at least some of the depicted images, the method for modifying comprising the steps of:

measuring at least one physiological activity of the operator to obtain at least one physiological signal having a value indicative of the level of the at least one physiological activity, modifying the motion and/or position sensing capability of the operator controlled input device by modifying one or more position reference signal elements in response to (a) changes in the measured at least one physiological signal and/or (b) differences between the measured at least one physiological signal and a corresponding predetermined desired physiological signal level, thereby modifying the ability of the operator to control and interact with at least some of the depicted images, wherein the one or more position reference signal elements comprise a plurality of LEDs, two of which emit light at any particular time; wherein the operator controlled input device comprises a light detector for detecting light emitted from the LEDs, and wherein the step of modifying one or more position reference signal elements comprises the step of changing which two of the LEDs are emitting light at any particular time, digitizing the at least one physiological signal, testing the digitized physiological signal against a corresponding predetermined desired physiological signal level; and, on the basis of the test, dynamically adjusting digitally controlled potentiometers that are configured as voltage dividers to modulate the voltage that powers the one or more motion and/or position-sensing elements, thereby modifying the motion and/or position sensing capability of the operator controlled input device in response to (a) changes in the measured at least one physiological signal and/or (b) differences between the measured at least one physiological signal and a corresponding predetermined desired physiological signal level, thereby modifying the ability of the operator to control and interact with at least some of the depicted images.

20. The method of claim 19, wherein the one or more motion and/or position sensing elements comprise one or more accelerometers and/or one or more gyroscopes.

* * * * *